United States Patent Office 2,848,817
Patented Aug. 26, 1958

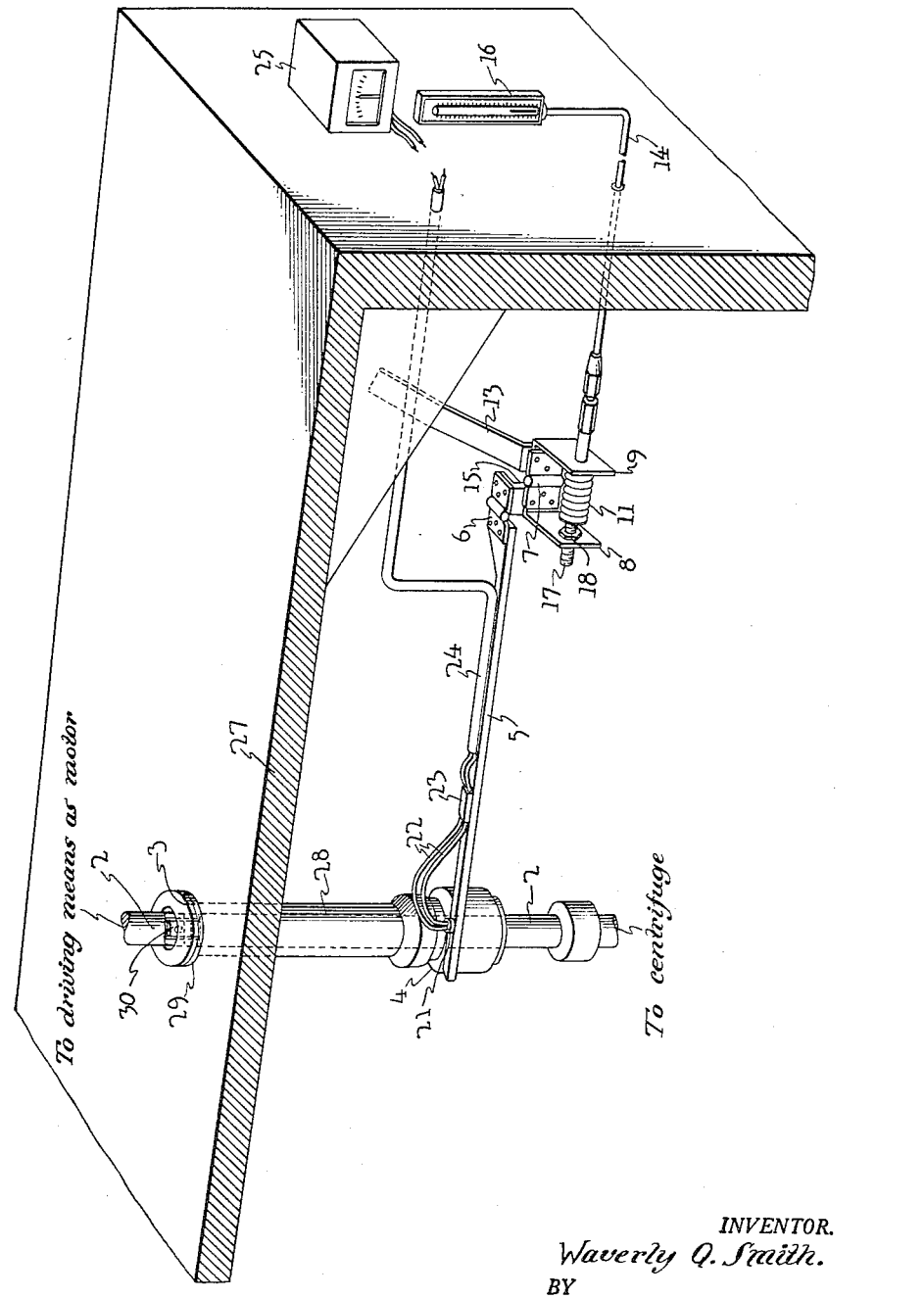

2,848,817

MEANS FOR DETERMINING CENTRIFUGE ALIGNMENT

Waverly Q. Smith, Oak Ridge, Tenn., assignor to the United States of America as represented by the United States Atomic Energy Commission Application February 27, 1945, Serial No. 580,048

5 Claims. (Cl. 33—172)

This invention relates to means for determining the alignment of a rotating shaft or comparable means driving or otherwise associated with certain chemical equipment. More particularly, this invention concerns a device for determining or testing the vibration wobbling or swaying of a centrifuge operating under conditions of remote control.

In the prior art, although centrifuges and other similar items of chemical equipment are frequently used in chemical processes, they are generally used under conditions where an operator may make visual inspection. Also, in the event of failure or trouble developing in the conventional operation of high speed rotating equipment, workmen can easily shut down the equipment and make repairs. At present, however, there is a field of chemical operation, namely the carrying out of the processes for the separation and recovery of radioactive materials, wherein many steps of the process must be carried out in cells enclosed by shielding. It is impossible for workmen to approach the chemical apparatus either for observation of the operation or for other purposes due to the presence of the radioactive materials which may give off dangerous radiations. In the event that equipment failure occurs under such circumstances, it involves considerably more problems than normal chemical equipment repair since decontamination and other procedures are required to render the apparatus in a condition whereby workmen may make necessary repairs. Processes for treating radioactive materials are described in U. S. patent application Ser. No. 519,714, now Patent No. 2,785,951, issued March 19, 1957, and in other applications. As described therein, certain of the steps involve the separation of radioactive precipitates in a centrifuge rotated at relatively high speeds.

It is, therefore, apparent that the provision of means whereby the operation of a centrifuge may be followed, particularly as respects the alignment of the rotating parts and the development of wobble, swaying, or similar difficulties while the equipment is being operated by remote control, is a beneficial result. That is, if it may be determined beforehand that vibration or wobbling are developing in the equipment, reduction of centrifuge speed or other steps may be taken by the operator, thereby forestalling potential bearing failure or other destructive tendencies or difficulties arising with respect to the particular piece of equipment.

I have developed a relatively simple but particularly efficient means which may be applied to all the usual types of centrifuges for testing and determining operational characteristics as above indicated.

This invention has for one object to provide means for determining certain operational characteristics of a rotating shaft or comparable means driving, or otherwise associated with, chemical equipment.

Another object is to provide a device for determining centrifuge alignment.

Another object is to provide a device particularly suitable for use on chemical equipment operating under remote control conditions for determining vibration, wobbling, or swaying of a rotating part.

Still another object is to provide a device of the class indicated which is in itself relatively simple and inexpensive of construction, and which is not prone to fall into disrepair, but which is capable of accomplishing the functions referred to.

A still further object is to provide a device of the class described wherein the gauge or other indicating means associated therewith may be positioned at some distance from the remainder of the device.

Other objects will appear hereinafter.

For a more complete understanding of my invention, reference will be made to the attached drawing forming a part of the present application. The drawing comprises a conventionalized showing in perspective of the operational features of my invention.

Referring now to the details of the construction and operation, 2 represents a portion of a rotating shaft connected to a centrifuge (not shown) of a type referred to above such as a conventional Bird suspended bowl centrifuge. The upper part of this shaft and housing 28 extend through shielding 27, as at 3, and are non-rigidly supported within a resilient ring 29, such as a rubber ring. The upper part of shaft 2 is connected through a universal joint 30 to driving means for the centrifuge (not shown). The shaft 2 rotates within the suspension head housing 28. This housing carries therewithin support bearings and the like the same as any conventional suspended centrifuge. This entire housing from point 3 down is free to sway with the centrifuge bowl and to creep around. Thus, there can be no tight connections to it. The details of the housing construction, bearings, and the like are conventional and form no part of the present invention. However, it might be mentioned that one advantage of the suspended construction is that if the centrifuge bowl is unevenly loaded, the shaft is free to move to compensate for this unevenness.

At some suitable point such as in the vicinity of a bearing within the housing, namely as on shoulder 4 of the suspended housing, would be positioned the device of the present invention.

This device comprises a arm, such as a right-angle piece 5 of steel or iron or other metal. One end of this arm is positioned on the aforesaid shoulder, and the other end is attached to a suitable spring hinge member 6 as shown positioned in one plane as, for example, the horizontal plane. This attachment may be securely made in any conventional manner as by welding or bolting. Such details are not a limitation on my invention. Hinge member 6 is merely an ordinary spring door hinge of good quality. As will be apparent, spring hinge member 6 merely permits freedom of vertical movement without binding. Rigidly attached to spring hinge member 6 is another similar member 7 positioned in another plane, as for example, the vertical plane. The attachment is accomplished by the right angle member 15 welded or securely bolted to the spring hinge members 6 and 7.

By such arrangement the angle-iron member 5 is held firmly, but without binding, against the suspended shoulder 4 so that any movement of the shaft 2 during rotation from the vertical within the housing 28, will be transmitted by way of the housing to the device. The latter-mentioned spring hinge member 7 has attached thereto protruding plate means 8 and 9 between which is positioned a bellows device 11 of any conventional construction.

An adjustment screw assembly 17 is provided so that the bellows 11 may be zeroed in a predetermined position. That is, with the member 5 positioned on shoulder 4, and the housing 28 for shaft 2 in the desired alignment, the adjustment screw member may be manipulated as required so that bellows 11 is under neither compression or extention, and the adjustment screw tightened in place by lock nut 18. Any departure from the setting will then affect the bellows. The foregoing may be accomplished prior to putting the equipment into operation, namely before radioactive materials are introduced into the centrifuge which shaft 2 drives.

The protruding plate means 8 and 9 may comprise ordinary ninety degree angle-irons bolted or welded to spring hinge 7. Hinge 7, as described with respect to hinge 6, may comprise a spring door hinge of good quality. It is, of course, apparent that rather than securely attaching angle members 8 and 9, an extra wide spring hinge may be obtained and the extremities bent to obtain the described configuration.

The entire assembly is solidly supported by a bracket or other construction 13. The bellows is connected by tubing 14 to a visible gauge 16 positioned at some point removed, as for example, on a control panel. This tubing may be a plastic tubing such as that sold in the trade under the name of Saran. The tubing is filled with a suitable liquid, as for example water having a layer of colored oil in the portion thereof where readings will be noted in the gauge on the instrument panel. Other gauge or recording means may be used, the aforementioned merely being illustrative since such parts are standard items.

There may also be associated with that portion of my device which bears against shoulder 4, a temperature recording element 21. This may comprise thermocouple elements or the like. This is connected by parallel wires 22 to the terminal box 23 which in turn is connected with electrical conductors that lead outside the cell to a temperature indicating device such as a standard recording thermometer 25 or other similar device for indicating temperature.

The entire assembly excepting the gauges aforementioned is enclosed in shielding 27 forming the framework of and enclosing the cell. The shielding may comprise special concrete or other compositions used for shielding purposes.

In general, there has been provided a device which may be attached to centrifuges of the type referred to which will permit the notation of the centrifuge alignment. The notation may be at a point remotely situated from the centrifuge operations, as for example, on an instrument panel outside of the cell shielding. That is, the device may be interconnected with a suitable gauge or recorder, which means may be positioned on the control panel adjacent the controls for the centrifuge whereby the operator may observe the indicated alignment of the centrifuge and adjust the speed controls or other control devices accordingly.

The functioning of the apparatus is as follows: As the centrifuge rotates without vibration or wobbling, the arm 5 resting on the shoulder 4 aforementioned would retain its position of equilibrium and consequently the bellows would likewise assume a fixed position causing the liquid to remain relatively stationary in the visible gauge on the instrument panel. However, in the event that either sway or wobbling occurs in the rotating centrifuge shaft 2, this causes movement of the housing 28 which moves the member 5 which in turn acts upon the bellows by causing movement of hinge 7 changing the position of parts 8 and 9, as for example moving 8 closer to 9 and thereby compressing the bellows. This affects the liquid in the bellows and may be observed by the change in liquid level in the visible gauge 16. By means of a predetermined calibration, the changing of the position of the liquid in the visible gauge makes it possible for the operator to observe whether the centrifuge had entered a phase of vibration which is dangerous or undesirable, and appropriate control of the centrifuge or other measures may be carried out. If, because of friction from a bearing or otherwise, heat builds up within the housing 28, such undue temperature change is detected by the thermo sensitive means 21 which effect in turn is transmitted through the wires 22 and 24 to the outside indicating mechanism 25 where it is observed by the operator and appropriate steps may be taken. It is not possible to connect the temperature element directly and tightly to the housing or inner parts as the creep or sway might cause severance of the wiring connection. However, by the construction shown herein satisfactory temperature indication may be had as the temperature element is always firmly positioned against the housing, yet the construction is sufficiently non-rigid to permit movement. As is apparent from the preceding description, although housing 28 is merely mounted on the rubber ring 29 and is free to move, it does not rotate with shaft 2. It has been found, however, that there is sufficient movement to affect the device of the present invention for indicating sway or wobble.

From the foregoing it may be seen that I have provided a useful indicating device for use with chemical equipment as described. The device may be constructed from readily obtainable inexpensive parts, but yet provides a device by which alignment may be sufficiently accurately indicated in industrial processes on a sizeable scale operated under remote control conditions.

In addition to the temperature indicating device, various other refinements or changes may be made.

It is to be understood that all matters contained in the above description and examples are illustrative only and do not limit the scope of this invention, as it is intended to claim the invention as broadly as possible in view of the prior art.

I claim:

1. In an apparatus for indicating the lateral displacement of a suspended type centrifuge at a remote point, in combination, a feeler member positioned so as to bear against the housing of the centrifuge shaft so that any sway or wobble of the shaft is imparted to the feeler member, mounting means for the feeler member comprising a plurality of spring hinge members, one of said hinge members having its pivot in a vertical plane to permit lateral displacement of said feeler member and one of said hinge members having its pivot in a horizontal plane so that said feeler member is non-rigidly mounted as respects up and down movement, means comprising an expansible-contractible element and a member actuatable by lateral displacement of said feeler member for compressing said element, said element having a fluid therein and a visible indicator associated with the element for indicating by means of said fluid the amount of compression of said element.

2. In an apparatus for remotely indicating lateral displacement of a suspended type centrifuge, in combination, means comprising a feeler arm positioned to laterally engage a part of the centrifuge adjacent an annular shoulder thereon, mounting means for the feeler arm including spring hinge members, one of said members having a position to urge the feeler arm against said shoulder and another of said members having a position to urge said feeler arm towards the axis of the centrifuge shaft and a remote indicator connected to said feeler arm to indicate lateral displacement of the centrifuge occasioned by sway or wobble thereof.

3. In an apparatus for indicating lateral displacement of a centrifuge of the suspended type having a universal joint in the suspension thereof, in combination, means comprising a feeler arm laterally engaging a portion of the centrifuge mechanism having an extending shoulder, mounting means for the feeler arm comprising a first pivot positioned for lateral movement of said feeler arm and having spring means to urge the feeler arm towards the centrifuge and a second pivot positioned to permit angular movement of the feeler arm in a vertical plane and having spring means normally urging the feeler arm against the said shoulder, and indicator means associated with the feeler arm to remotely indicate the magnitude of lateral displacement thereof occasioned by sway or wobble of the centrifuge.

4. Apparatus, as claimed in claim 3, wherein said last named means includes a flexible bellows having one end fixed and the other end attached to said mounting means to follow the lateral movements of said feeler arm.

5. Apparatus, as claimed in claim 3, wherein said last named means includes a flexible bellows having one end fixed and the other end attached to said mounting means to follow the lateral movements of said feeler arm, a hollow tube communicating with the interior of, and extending remotely from, said bellows, and a liquid filling said bellows and at least a portion of said tube.

References Cited in the file of this patent

UNITED STATES PATENTS

| | | |
|---|---|---|
| 358,164 | Post | Feb. 22, 1887 |
| 1,030,099 | Llobet | June 18, 1912 |
| 1,783,251 | Marr et al. | Dec. 2, 1930 |
| 1,907,540 | Hebler | May 9, 1933 |
| 2,074,840 | Greentree | Mar. 23, 1937 |
| 2,235,279 | Bunker | Mar. 18, 1941 |
| 2,378,018 | Inman | June 12, 1945 |

FOREIGN PATENTS

| | | |
|---|---|---|
| 496,584 | Germany | Apr. 28, 1930 |